(12) United States Patent
Jain et al.

(10) Patent No.: US 10,700,977 B2
(45) Date of Patent: *Jun. 30, 2020

(54) PREVENTING TCP FROM BECOMING TOO CONSERVATIVE TOO QUICKLY

(71) Applicant: Akamai Technologies, Inc., Cambridge, MA (US)

(72) Inventors: Manish Jain, Cambridge, MA (US); Mangesh M. Kasbekar, New York, NY (US)

(73) Assignee: Akamai Technologies, Inc., Cambridge, MA (US)

(*) Notice: Subject to any disclaimer, the term of this patent is extended or adjusted under 35 U.S.C. 154(b) by 25 days.

This patent is subject to a terminal disclaimer.

(21) Appl. No.: 15/675,816

(22) Filed: Aug. 14, 2017

(65) Prior Publication Data
US 2017/0346738 A1    Nov. 30, 2017

Related U.S. Application Data

(63) Continuation of application No. 14/011,021, filed on Aug. 27, 2013, now Pat. No. 9,736,072.

(60) Provisional application No. 61/693,526, filed on Aug. 27, 2012.

(51) Int. Cl.
| H04L 12/801 | (2013.01) |
| H04W 28/02 | (2009.01) |
| H04L 12/807 | (2013.01) |
| H04L 12/841 | (2013.01) |

(52) U.S. Cl.
CPC .............. *H04L 47/12* (2013.01); *H04L 47/27* (2013.01); *H04L 47/28* (2013.01); *H04W 28/0242* (2013.01); *H04W 28/02* (2013.01)

(58) Field of Classification Search
None
See application file for complete search history.

(56) References Cited

U.S. PATENT DOCUMENTS

| 7,127,310 B1* | 10/2006 | Barto | ............... G05B 19/41865 700/100 |
| 2003/0103452 A1* | 6/2003 | Le | .......................... H04L 1/1832 370/229 |
| 2008/0025216 A1* | 1/2008 | Singh | ....................... H04L 47/10 370/231 |

* cited by examiner

*Primary Examiner* — Jeffrey M Rutkowski
*Assistant Examiner* — Ning Li
(74) *Attorney, Agent, or Firm* — David H. Judson

(57) ABSTRACT

A technique that addresses the problem of a TCP connection's throughput being very vulnerable to early losses implements a pair of controls around ssthresh. A first control is a loss forgiveness mechanism that applies to the first n-loss events by the TCP connection. Generally, this mechanism prevents new TCP connections from ending slow-start and becoming conservative on window growth too early (which would otherwise occur due to the early losses). The second control is a self-decay mechanism that is applied beyond the first n-losses that are handled by the first control. This mechanism decouples of ssthresh drop from cwnd and is thus useful in arresting otherwise steep ssthresh drops. The self-decay mechanism also enables TCP to enter/continue to be slow-start even after fast-recovery from a loss event.

1 Claim, 4 Drawing Sheets

PREVENTING TCP FROM BECOMING TOO CONSERVATIVE TOO QUICKLY

BACKGROUND

Technical Field

This application relates generally to data communication over a network.

Brief Description of the Related Art

Transmission Control Protocol (TCP) is a core Internet protocol that is the transport layer of the TCP/IP suite. It provides a communication service between an application program and the Internet Protocol (IP). When the application desires to send a large chunk of data across the Internet using IP, it issues a single request to TCP, which then controls IP to send data "in a form of message units" between computers over the Internet. While IP handles actual delivery of the data, TCP keeps track of the individual units of data transmission (segments) into which a message is divided into for efficient routing through the network. For example, when an HTML file is sent from a Web server, the TCP software layer of that server divides the sequence of octets of the file into segments and forwards them individually to the IP software layer, which encapsulates each TCP segment into an IP packet by adding a header that includes the destination IP address. When the client program on the destination computer receives the segments, the TCP layer reassembles the individual segments and ensures they are correctly ordered and error free as it streams them to an application.

TCP uses a congestion control strategy. For each connection, TCP maintains a congestion window that limits the total number of unacknowledged packets that may be in transit end-to-end. TCP uses a mechanism called slow start to increase the congestion window after a connection is initialized and after a timeout. It starts with a window of two times the maximum segment size (MSS). Although the initial rate is low, the rate of increase is high in that, for every packet acknowledged, the congestion window increases by 1 MSS so that the congestion window effectively doubles for every round trip time (RTT). When the congestion window exceeds a threshold (ssthresh), the algorithm enters a congestion avoidance state.

A variant of TCP, called Reno, also implements so-called fast recovery. In this state, TCP retransmits the missing packet that was signaled by three duplicate ACKs, and waits for an acknowledgment of the entire transmit window before returning to congestion avoidance. If there is no acknowledgment, TCP Reno experiences a timeout and enters the slow-start state. TCP New Reno, defined by RFC 3782, improves retransmission during the fast recovery phase of TCP Reno. During fast recovery, for every duplicate ACK that is returned to TCP New Reno, a new unsent packet from the end of the congestion window is sent, to keep the transmit window full. In New Reno, ssthresh starts from infinite and gets modified at each loss event. It is set to the congestion window at the time of loss*ssthresh_decay_factor. It may grow linearly after this point.

As a result, the TCP connection's throughput is very vulnerable to early losses and even a few consecutive losses.

BRIEF SUMMARY

This disclosure provides an enhancement to known TCP implementations, such as New Reno, that prevents TCP from becoming too conservative too quickly. The technique is advantageous in various operating scenarios, such as highly-variable mobile environments, or where it is required to push small objects aggressively.

The technique addresses the problem of the TCP connection's throughput being very vulnerable to early losses by providing several new controls around ssthresh. A first control is a loss forgiveness mechanism that applies to the first n-loss events by the TCP connection. Generally, this mechanism prevents new TCP connections from ending slow-start and becoming conservative on window growth too early (which would otherwise occur due to the early losses). The second control is a self-decay mechanism that is applied beyond the first n-losses that are handled by the first control. This mechanism decouples of ssthresh drop from cwnd and is thus useful in arresting otherwise steep ssthresh drops. The self-decay mechanism also enables TCP to enter/continue to be slow-start even after fast-recovery from a loss event.

With these optimizations, the congestion window still behaves as it would with standard TCP implementations. These controls, however, address TCP's aggressiveness in backing off, namely, by preventing an upper limit from rapidly decreasing when there is packet loss.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Distributed computer systems are well-known in the prior art. One such distributed computer system is a "content delivery network" or "CDN" that typically is operated and managed by a service provider. The service provider typically provides the content delivery service on behalf of third parties (customers) who use the service provider's shared infrastructure. A distributed system of this type is sometimes referred to as an "overlay network" and typically refers to a collection of autonomous computers linked by a network or networks, together with the software, systems, protocols and techniques designed to facilitate various services, such as content delivery, application acceleration, or other support of outsourced origin site infrastructure. A CDN service provider typically provides service delivery through digital properties (such as a website), which are provisioned in a customer portal and then deployed to the network.

Figure 1:
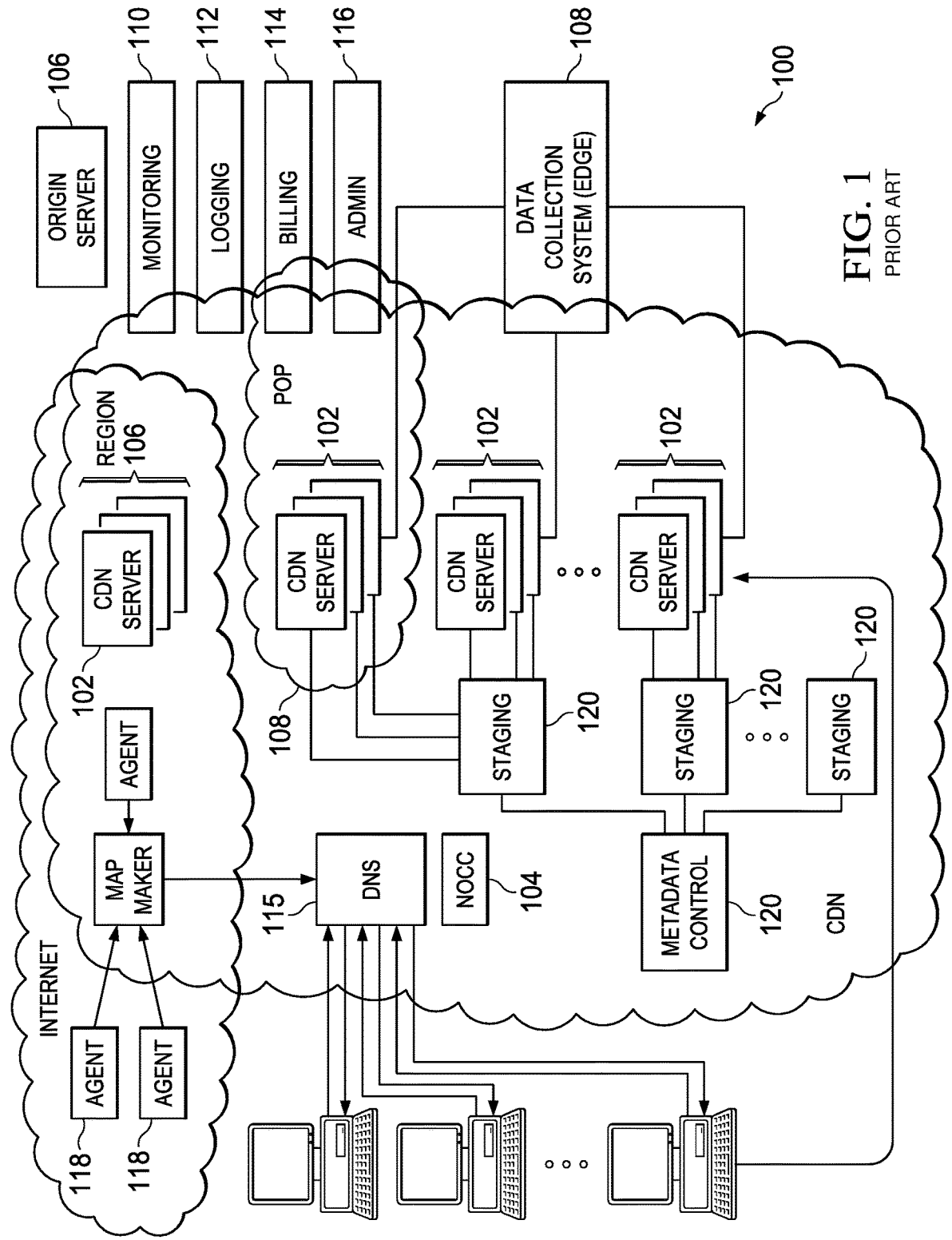
FIG. 1 is a block diagram illustrating a known distributed computer system configured as a content delivery network (CDN)

FIG. 1 illustrates a known distributed computer system that (as described below) is extended by the techniques herein.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
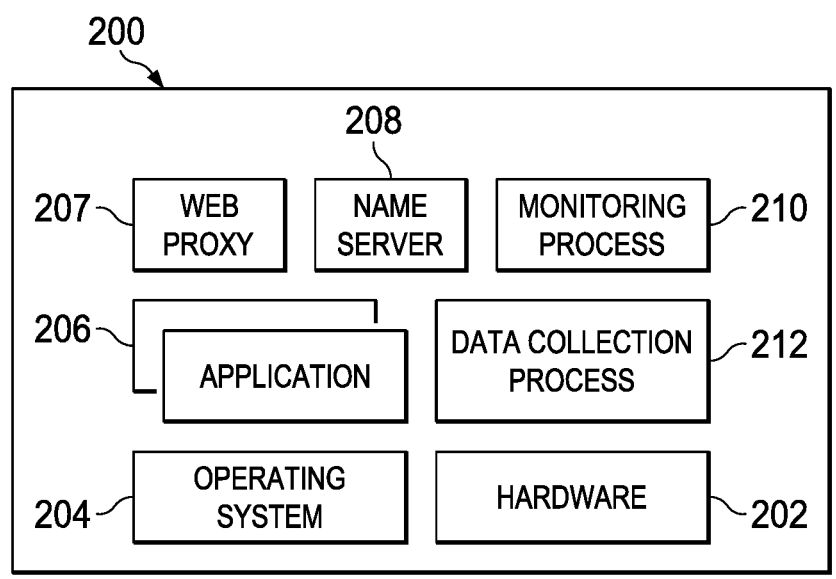
FIG. 2 is a representative CDN edge machine configuration that includes an HTTP proxy that is configured to implement the TCP-FTL algorithm of this disclosure.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP (web) proxy 207, a name server 208, a local monitoring process 210, and distributed data collection process 212. More generally, the proxy 207 is software, comprising program instructions, which instructions are held in memory and executed by a processor (or multiple processors) as needed.

For streaming media, the CDN machine typically includes one or more media servers, such as a Windows Media Server (WMS) or Flash server, as required by the supported media formats. An alternative to using dedicated media servers uses HTTP as the transport protocol. Architectures for HTTP-based live stream and VOD-based delivery are described in U.S. Publication No. 20110173345.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

An overlay network web proxy (such as proxy 207 in FIG. 2) that is metadata-configurable is sometimes referred to herein as a global host or GHost process.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

For a typical HTTP-based streaming use case, the client resolves a name (e.g., domain name, hostname, etc.) through DNS to an IP address and makes a TCP connection to the server associated with that address. Once established, the client sends an HTTP GET request for the desired content, e.g., a media fragment. The server responds with the content data in a standard HTTP response body. The connection is kept open for further requests and responses.

An overlay network server may provide content to mobile devices, which typically operate on mobile or WiFi networks. A representative mobile device is a smartphone or tablet, such as the iPhone® or iPad®, that executes client-side mobile apps, or that includes a web browser. Such a device comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The client is not limited to a mobile device, as it may be a conventional desktop, laptop or other Internet-accessible machine running a web browser or any other application that is capable of connecting or adapted to the Internet.

With the above as background, the subject matter of this disclosure is now described.

Preventing TCP from Becoming Too Conservative Too Quickly

For purposes of illustration only, the following assumes a TCP implementation in a computing machine comprising hardware (processor, computer memory), an operating system (e.g., Linux) that implements TCP, and an application layer comprising an application such an HTTP proxy. For example, and as described above with respect to FIG. 1, the HTTP proxy may a content delivery network (CDN) edge server that is configurable to provide one or more content delivery features, preferably on a domain-specific, customer-specific basis, preferably using configuration (or so-called metadata) files that are distributed to the edge servers using a configuration system.

The above-described operating environment is not intended to be limiting, as the techniques herein may be implemented in any computing machine that executes TCP, TCP Reno, TCP New Reno, or any other TCP-variant.

As is well-known, the TCP congestion control algorithm works as follows.

Initially, the congestion window=CWND_INIT and ssthresh is essentially infinity. While the congestion window is <ssthresh, TCP is in slow-start phase and the congestion window increases by 1 packet for every ACK received. Once the congestion window>=ssthresh, TCP transitions to congestion-avoidance phase and the congestion window increases by 1/cwnd for every ACK received. A single loss event will make TCP transition from slow-start to congestion-avoidance. Loss recovery can happen in two ways: either by triple-duplicates or timeouts. After triple duplicates ACKs, the congestion window=ssthresh=cwnd/2. After a timeout, ssthresh=cwnd/2 and cwnd=CWND_INIT.

According to this disclosure, it is assumed that there is a minimum ssthresh value (called ssthresh_min) that can be established. Given this value, two (2) new parameters may then be associated with ssthresh: so-called "loss forgiveness," and "self-decay." As used herein, a TCP implementation that has been enhanced to use these parameters (and their associated mechanisms as described below) is sometimes referred to as "TCP-FTL." As will be seen, both of these parameters control how the ssthresh is decayed in response to loss events. At a high level, they both work by decoupling decay of ssthresh from decay of cwnd. There are two changes to TCP as a result of these parameters: (a) slow ssthresh decay compared to standard TCP (b) TCP using these two parameters, unlike standard TCP, can continue/enter in slow-start even after one or more loss events that are recovered by fast-recovery.

Each of these mechanisms is now described below.

Loss Forgiveness

The loss forgiveness mechanism applies to the first n-loss-events by the TCP connection. Generally, the mechanism prevents new TCP connections from ending slow-start and getting conservative on window growth too early due to some early losses. The mechanism may be used, for example, in mobile environments where loss is not always an indicator of congestion.

The mechanism may be turned on using the following metadata control that is provisioned in a server:

ssthresh_initial_loss_forgiveness_factor—when set to n, TCP will be forgiving to the first n-losses. Instead of dropping ssthresh like New Reno does, when this mechanism is used ssthresh drops from infinity to ssthresh_min using a concave exponential function over n losses. This factor ensures that no connection is stuck in low ssthresh regime due to a chance loss or otherwise too early in the lifetime of the connection. Preferably, the factor is set to a given range of values (e.g., 1-10), representing an amount of "forgiveness." Note that the forgiveness applies to ssthresh reduction and not to cwnd reduction. The cwnd growth is still determined by standard TCP logic of whether cwnd is in slow-start phase or congestion-avoidance phase, as described above. The difference from standard TCP is that with this parameter, TCP can enter/continue to be in slow-start even after a loss event recovered by fast-recovery.

This parameter allows TCP to be more forgiving for initial losses. It allows specifications of how many losses will be forgiven so that ssthresh does not drop as aggressively. As noted above, when this control is implemented, for the first n losses, ssthresh will drop from infinity to ssthresh_min using a concave exponential function.

Self-Decay

A self-decay mechanism comes into play beyond the first-n-losses that were handled by the loss-forgiveness mechanism. Introduction of this parameter allows decoupling of ssthresh drop from cwnd drop and is useful to arrest steep ssthresh drops beyond loss-forgiveness. Similar to loss-forgiveness, self-decay only changes the ssthresh decay, and it leaves cwnd growth/decay to standard TCP mechanisms. Also, and similar to loss forgiveness, TCP using this parameter can enter/continue to be slow-start even after fast-recovery from a loss event.

In one embodiment, the mechanism may be turned on using a control that is provisioned in a server:

ssthresh_self_decay_factor—a drop of ssthresh beyond initial forgiveness is controlled by this factor. At every loss event, ssthresh is set to:

max(current *ssthresh*ssthresh_self_decay_factor, ssthresh_min)

This mechanism ensures that ssthresh does not drop dramatically to ssthresh_min when there are a handful of consecutive loss events, which is more likely to happen in mobile environments. The factor has an allowed range of values from 0-100%.

This factor decouples cwnd decay from ssthresh decay. It limits how quickly ssthresh can drop and maintains a memory of historical ssthresh parameters.

In an alternative embodiment, the mechanism may be turned on through a configuration in an application, in an operating system, or the like.

Algorithm

The following provide a representative algorithm (© 2012, Akamai Technologies). In this example, lft refers to the ssthresh_initial_loss_forgiveness_factor. The ssthresh_decay_factor is an exponential decay factor applied to cwnd. The term selfdecayfactor refers to ssthresh_self_decay_factor.

At initialization, the following relationships are established:

$$ssthreshdrop = ssthreshmax,$$

$$ssthresh = ssthresmax, \text{ and}$$

$$lff = e \wedge [\{\ln(1/ssthreshmax)\}/lft].$$

At each loss event up to lft losses, the following relationships are then enforced:

$$ssthreshdrop = ssthreshdrop/lff,$$

$$ssthresh = ssthresh - ssthreshdrop, \text{ and}$$

$$cwnd = cwnd(ssthreshdecayfactor).$$

The algorithm outputs values of cwnd and ssthresh. The parameter ssthresh has a lower bound of 1 or ssthresh_min if specified; cwnd has a lower bound of 1. The constant ssthreshmax is a maximum value of ssthresh.

Test Data

A version of the Linux kernel and an overlay network web proxy (the ghost process described above) were configured to support TCP-FTL in a test lab. Data was collected for a large file download with 2% packet loss generated using test conditions. The TCP-FTL parameters were set in ghost metadata as follows:

ssthresh_min=10
ssthresh_loss_forgiveness_factor=6
ssthresh_self_decay_factor=95%, and
ssthresh_decay_factor=80%.

Figure 3:
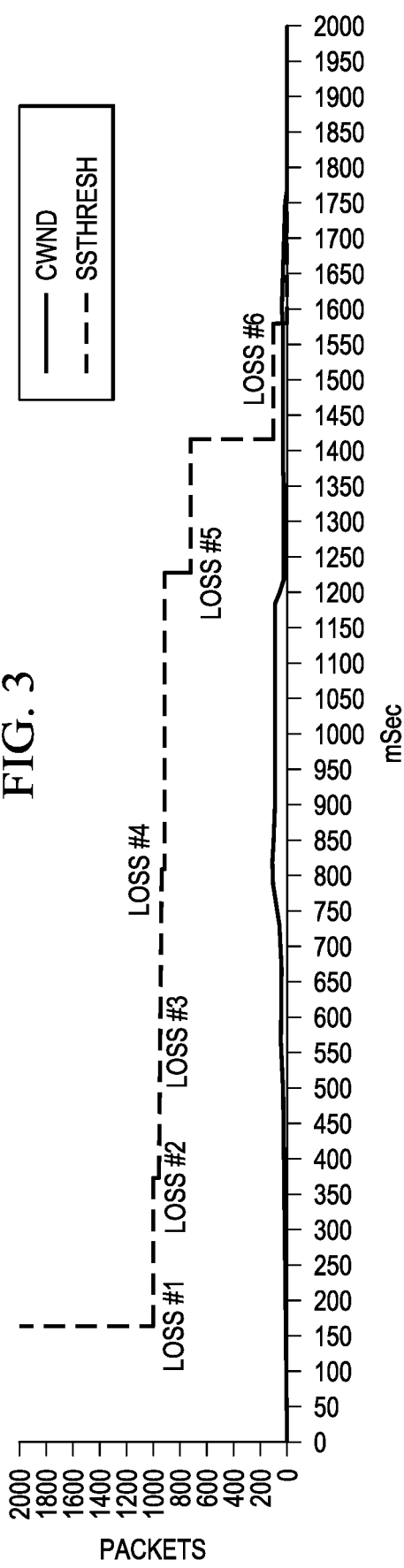
FIG. 3 is a graph that illustrates a slow-start phase in a representative test case scenario over six (6) loss events.
Figure 4:
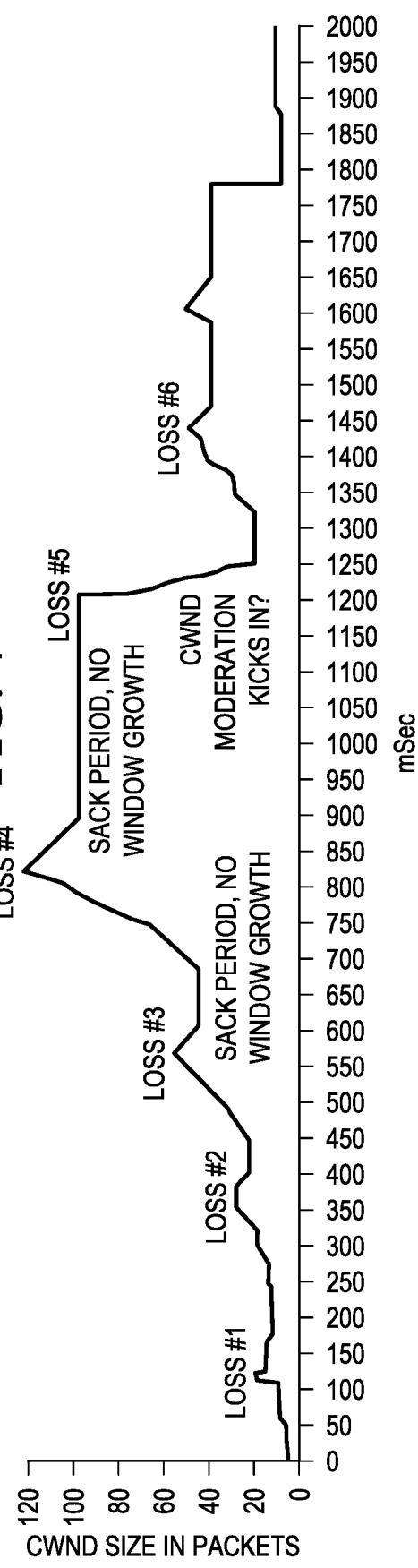
FIG. 4 illustrates the CWND data is more detail from the graph in FIG. 3.
Figure 5:
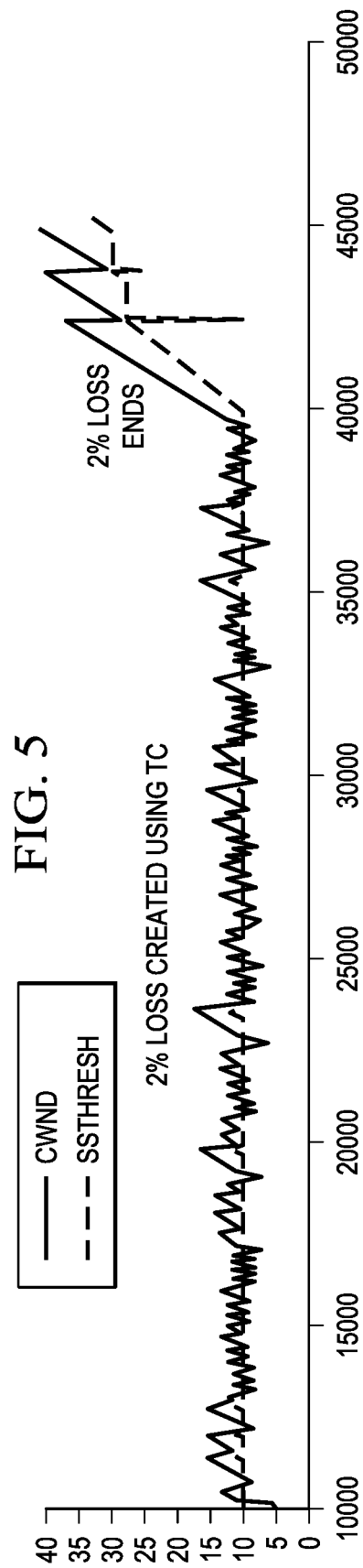
FIG. 5 is a graph that illustrates the congestion avoidance phase in the representative test case scenario.

FIG. 3 and FIG. 4 show the slow-start phase in detail. As can be seen in the graph of FIG. 3, ssthresh falls in a concave exponential curve towards ssthresh_min over the six (6) loss events. Also, as can be seen in the graph of FIG. 4, which is a more detailed (zoomed) view of the graph in FIG. 3, cwnd does drop at every loss event; rather, it continues to grow exponentially because ssthresh is quite high. This extends the exponential slow-start phase through the initial-loss-forgiveness phase. FIG. 5 illustrates the congestion avoidance phase, post initial loss-forgiveness. In the test scenario, ssthresh does not fall below 10, and as soon as the generated loss is over, both cwnd and ssthresh grow linearly. Thus, the test data establishes that the TCP-FTL technique fulfills its goal of preventing TCP from becoming too conservative too quickly.

In a representative implementation, the subject functionality is implemented in software, as computer program instructions executed by a processor.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an operating system and/or application layer solution, although this is not a limitation.

There is no limitation on the type of computing entity that may implement the TCP connection control functionality of this disclosure. Any computing entity (system, machine, device, program, process, utility, or the like) may provide this operation.

It is not required that both TCP optimizations described be implemented. One or both may be implemented separately.

As noted above, the techniques herein may be implemented to facilitate content delivery over a mobile network.

What is claimed is as follows:

1. An edge server in a content delivery network (CDN), the edge server providing object delivery over Transmission Control Protocol (TCP) networking protocol that maintains a congestion window that limits a total number of unacknowledged data packets that may be in transit between the edge server and a requesting client, the TCP networking protocol providing, for a given TCP connection, a slow-start state, and a congestion avoidance state that is entered when the congestion window exceeds a threshold, the congestion window threshold having an initial start value and being modified after each loss event by a decay factor that reduces the threshold potentially to a minimum, the edge server comprising:

a processor;

an operating system having a kernel that includes TCP networking protocol support;

computer memory holding computer program instructions executed by the processor, the computer program instructions comprising:

first program code to control a rate of a decay of the congestion window threshold from the initial start value upon each of a configurable number of packet loss events, wherein a given packet loss event would otherwise end the slow-start state and transition the TCP connection to the congestion avoidance state, wherein the first program code is operative to drop the congestion window threshold from the initial start value to the minimum using a concave exponential function over each of the packet loss events; and second program code to control the rate of the congestion window threshold decay following operation of the first program code on the configurable number of packet loss events;

wherein the requesting client is a mobile device operating in a mobile network, the mobile network being distinct from the CDN.

* * * * *